Dec. 6, 1938.     H. E. TWOMLEY     2,139,048
VARIABLE SPEED MECHANISM
Filed Jan. 20, 1936     3 Sheets-Sheet 1

INVENTOR.
Herbert E. Twomley
BY Lyon & Lyon
ATTORNEYS

Dec. 6, 1938.    H. E. TWOMLEY    2,139,048
VARIABLE SPEED MECHANISM
Filed Jan. 20, 1936    3 Sheets-Sheet 3

INVENTOR.
Herbert E. Twomley
BY Lyon & Lyon
ATTORNEYS

Patented Dec. 6, 1938

2,139,048

UNITED STATES PATENT OFFICE 2,139,048

VARIABLE SPEED MECHANISM

Herbert E. Twomley, Riverside, Calif., assignor to Food Machinery Corporation, San Jose, Calif., a corporation of Delaware Application January 20, 1936, Serial No. 59,913

2 Claims. (Cl. 74—230.17)

This invention relates broadly to variable speed power transmitting systems employing variable diameter V pulleys, in which the V pulleys are made in two separable halves and variations in diameter are attained by shifting one of the halves toward and away from the other half. Movement of the one half of the pulley, however, not only changes the effective diameter of the pulley but also shifts the central plane of the pulley, thereby throwing it out of alignment with the belt to which it is coupled unless the cooperating pulley is also moved. A change in effective diameter of the pulley also tightens or loosens the belt, necessitating compensating relative movement of the driving and driven pulleys toward or away from each other to maintain a desired belt tension.

A particularly useful application of variable diameter V pulleys is in a speed reducing device employing a differential mechanism to obtain enormous speed reduction. Thus in a conventional differential mechanism consisting of three rotary members so coupled together by gears, friction wheels or the like that if two of the members are rotated at the same speed in opposite directions the third member remains stationary, a very low speed in either direction of the third member may be obtained by slightly changing the speed of one of the first two members, thereby causing the third member to rotate at a speed equal to the difference in the speeds of the other two members. The first two members may be conveniently driven at variable speeds in opposite directions by driving them from variable diameter V pulleys mounted on a common drive shaft and varying the relative diameters of the pulleys.

A broad object of the present invention is to provide a simple and practicable variable speed mechanism employing variable diameter V pulleys, in which the driving and driven pulleys are automatically maintained in approximate alignment with each other and the diameter of one of the pulleys is automatically varied, all in response to movement of the pulleys toward or away from each other to vary the tension on the belt connecting them.

Another object of the invention is to provide a simple, practicable driving mechanism for driving two members of a differential unit in opposite directions at speeds that can be varied inversely by extremely small increments.

More specific objects and features of the invention will appear from the following detailed description which refers to the drawings.

Figure 1:
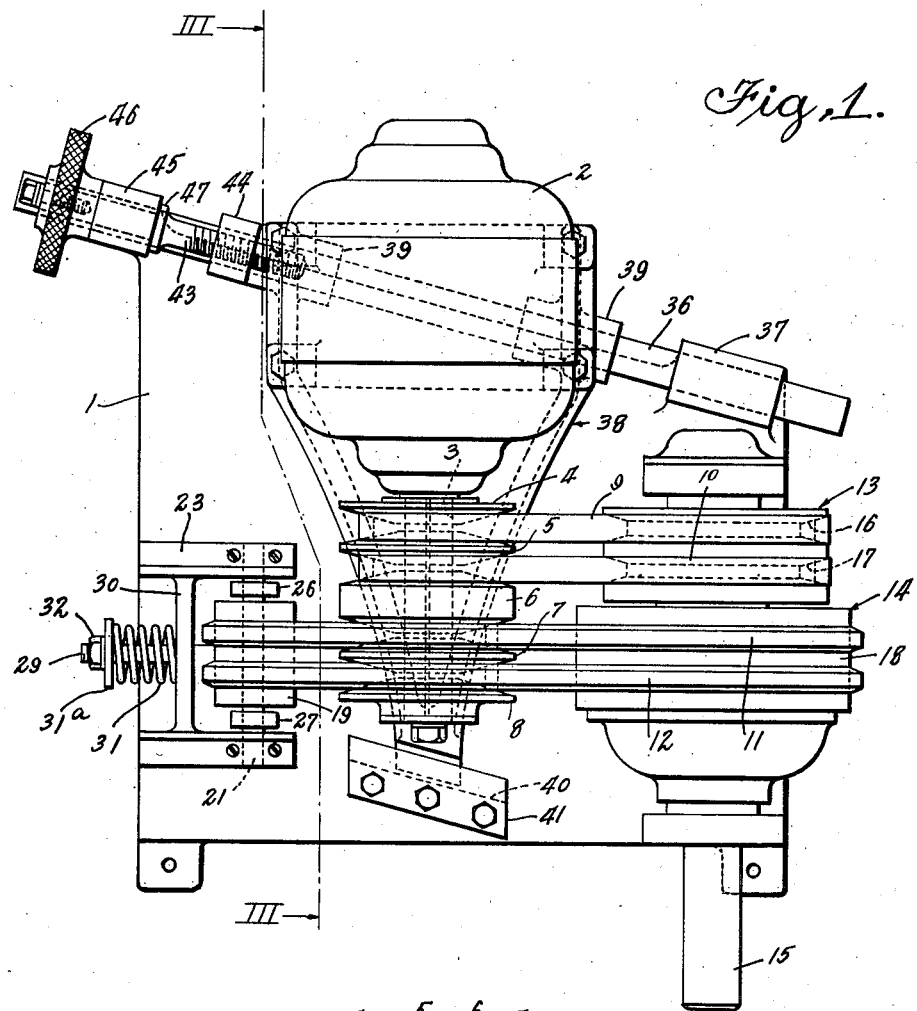
Fig. 1 is a plan view of a complete variable speed mechanism employing the invention.

Referring to Fig. 1, the variable speed transmission therein depicted comprises a supporting base 1 upon which is mounted a drive motor 2 having a drive shaft 3 upon which are mounted a series of drive pulley elements 4, 5, 6, 7 and 8, respectively, these elements defining four V pulleys cooperating with belts 9, 10, 11 and 12, respectively, to drive a pair of differential elements 13 and 14, respectively. The differential elements 13 and 14 are interconnected by any suitable mechanism (not shown) to each other and to a driven shaft 15, and function when rotated at different speeds in opposite directions to rotate the driven shaft 15 at a much lower speed.

Differential mechanisms of the general type described are old and well known and need not be here described in detail since they do not constitute a part of the present invention.

The differential members 13 and 14 are both mounted for rotation about a fixed axis and neither element is movable longitudinally. The member 13 is adapted to be rotated in the same direction as the motor shaft 3 and is therefore provided with pulley grooves 16 and 17, respectively, over which belts 9 and 10 are looped directly from the pulley grooves defined by the pulley members 4, 5 and 6 on shaft 3.

The differential member 14 is adapted to be rotated in a direction opposite to that of the motor shaft 3. To this end, the member 14 is provided with a cylindrical pulley surface 18, over which belts 11 and 12 are looped. From the pulley face 18, belts 11 and 12 extend past the shaft 3 and loop over a pair of cylindrical surface idler pulleys 19 and 20, respectively, and are then reverse looped from the idler pulleys 19 and 20 back over the pulley grooves defined between the pulley members 6, 7 and 8.

Figure 2:
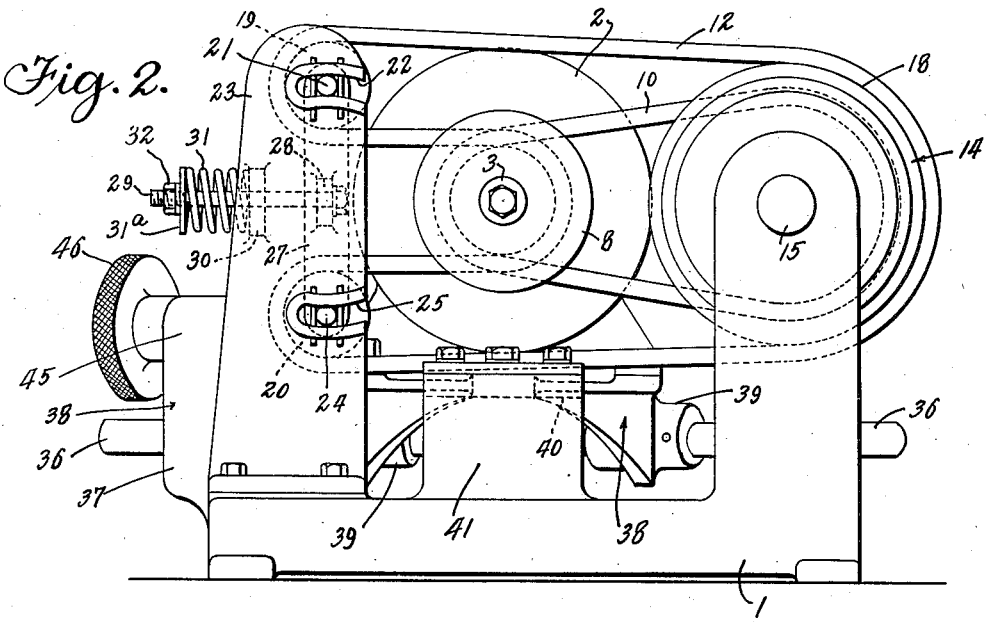
Fig. 2 is a front elevation view of the mechanism shown in Fig. 1.
Figure 3:
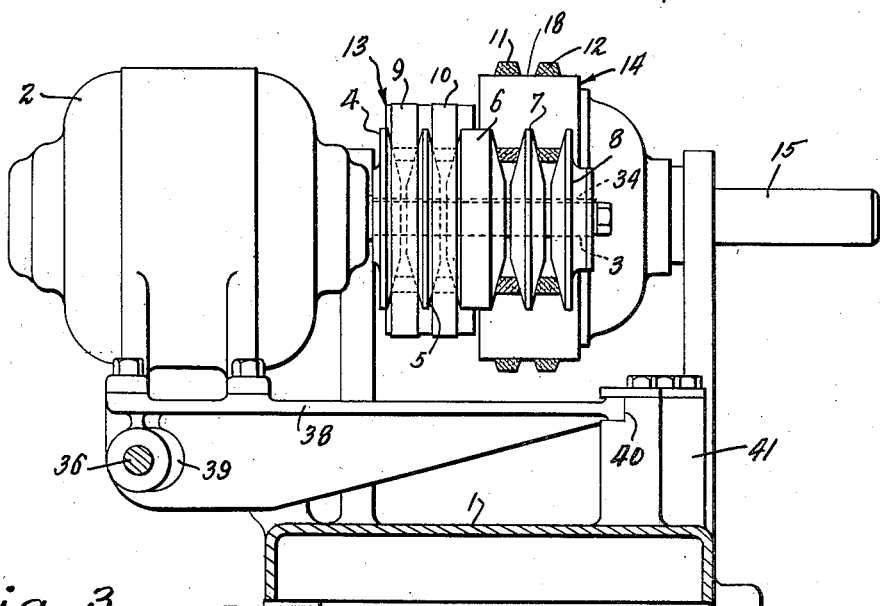
Fig. 3 is a side elevation, partially in section, taken along the line III—III of Fig. 1.

To maintain the belts 11 and 12 at a desired tension, the pulleys 19 and 20 are resiliently supported. Thus the pulley 19 is mounted for rotation upon an axle 21 which is supported at its outer ends in arcuate slots 22 in a stationary frame 23 attached to the base 1 and the pulley 20 is rotatably mounted upon an axle 24, the outer ends of which are supported in arcuate slots 25 in the frame member 23. The axles 21 and 24 also are journaled in apertures provided therefor in opposite ends of a pair of bars 26 and 27, respectively, which bars are interconnected at their mid points by a cross bar 28 (Fig. 2), thereby defining an H-shaped frame of which the bar 28 is the cross member. The frame is constantly urged in a direction away from the shaft 3, to tension the belts, by a bolt 29 secured to the cross member 28 and extending therefrom through a stationary cross member 30 which constitutes a part of the frame 23. A helical spring 31 is compressed between the member 30 and a washer 31a which is retained on the outer end of the bolt 29 by a nut 32.

Figure 6:
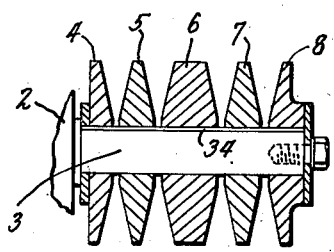
Fig. 6 is a detail longitudinal sectional view showing the construction of the drive pulleys and their attachment to the drive shaft.

Referring now to Fig. 6, it will be observed that the end pulley members 4 and 8, respectively, are secured solidly to the drive shaft 3 but that the intermediate pulley members 5, 6 and 7 are slidable longitudinally along the shaft, although they are constrained to rotate with the shaft by a spline 34 which engages cooperating grooves on the members 5, 6 and 7. It will be apparent from the construction described that the tension of any of the belts 9, 10, 11 or 12 tends to spread the pulley members with which it engages but that such spreading of the members engaged by any one belt is resisted by the spreading forces of the other belts acting against the other pulley members. Therefore, a condition of equilibrium will be reached where the tension of all the belts is substantially the same and when this condition is reached the relative diameters of the pulleys defined by members 4, 5 and 6 to the diameters of the pulleys defined by members 6, 7 and 8 will be a function of the distance of the shaft 3 from the differential members 13 and 14. In other words, movement of the shaft 3 toward the differential mechanisms 13 and 14 will reduce the tension on belts 9 and 10 and increases the tension on belts 11 and 12. As a result, the member 7 will move toward the motor 2 a certain distance, thereby reducing the effective diameter of the pulley defined by members 7 and 8. The member 6 will be moved a further distance toward the motor 2 in order to reduce the diameter of the pulley engaged by belt 11, and the movement of member 6 will also move the member 5 a lesser distance toward the motor 2, thereby increasing the effective diameters of the pulley grooves engaged by belts 9 and 10 and increasing the tension of those belts to their normal value.

It is apparent therefore that by merely shifting the motor 2 and the shaft 3 toward or away from the differential members 13 and 14, the diameters of the pulleys on shaft 3 are automatically varied to restore the normal belt tension and at the same time change the relative speeds of rotation of the differential members 13 and 14.

Unfortunately, however, the shifting of the pulley members 5, 6 and 7 longitudinally along the shaft 3 tends to throw the pulleys out of alignment with their belts. This is of no particular moment with respect to the differential pulley member 14 and the idler pulleys 19 and 20 because the belts 11 and 12 engage the cylindrical surfaces of these pulleys with their flat sides—this resulting from the fact that the belts 11 and 12 are reverse looped over the drive pulleys—and can shift longitudinally on the pulleys 18, 19 and 20 to maintain their alignment with the cooperating pulley grooves on the drive shaft.

The V belts 9 and 10, however, are direct looped over the differential member 13 and hence cannot drive the latter from their flat faces. Instead, they engage the pulley grooves 16 and 17 on the differential member 13. It is apparent, therefore, that if nothing is done to compensate for the longitudinal movements of the members 5 and 6 on the shaft 3, the belts 9 and 10 will be thrown out of alignment with the grooves 16 and 17 in certain positions of adjustment.

In accordance with the present invention, satisfactory alignment between the pulley grooves 16 and 17 on the differential member 13 and the cooperating pulley grooves defined by members 4, 5 and 6 is maintained under all conditions of adjustment by mounting the motor 2 for movement in a direction at an oblique angle to its axis instead of at right angles thereto, for changing the diameters of the pulley grooves defined by members 4 to 8, inclusive.

To this end, the motor 2 is slidably mounted upon a bar 36, secured to the base 1 by bracket members 37 and 45. The motor proper is mounted upon a sub base 38 having journals 39 slidably engaging the bar 36 and to prevent rotation of the motor and the sub base 38 about the bar 36, the sub base is extended to a point substantially below the outer end of the shaft 3 where it rides in a groove 40 in a support 41 rising from the main base 1 of the machine.

To normally retain the motor 2 in any desired position and to easily shift the motor along the bar 36, a screw 43 is threaded into a flange 44 on the sub base 38 of the motor, the screw extending parallel to the bar 36. The screw 43 is also rotatably mounted in a journal in the bracket 45 in the main frame 1 and has a hand wheel 46 keyed thereto at its outer end. A shoulder 47 on the screw 43 and the hub of the hand wheel 46, respectively, bear against opposite ends of the bracket 45 and prevent any longitudinal motion of the screw 43 with respect to the base 1. By rotating the hand wheel 46, the motor 2 may be shifted in either direction along the bar 36.

Figure 4:
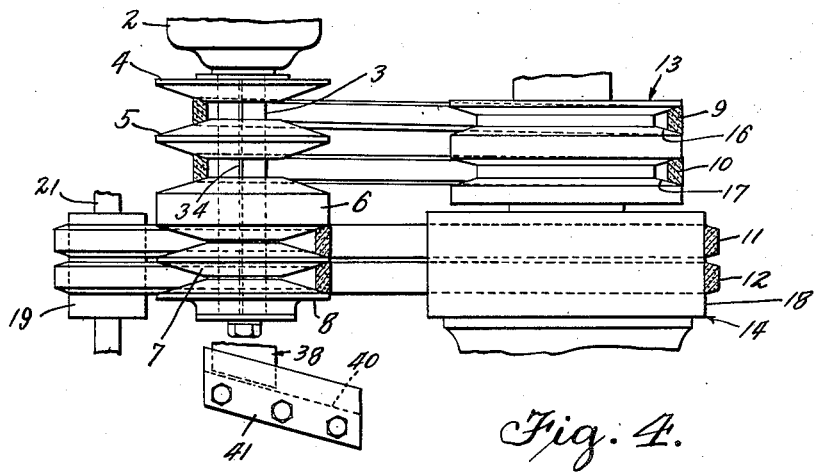
Fig. 4 is a detail plan view of the pulleys of the mechanism in one position of adjustment.

It will be observed that movement of the motor 2 along the bar 36 in a direction to carry the shaft 3 away from the differential members 13 and 14 moves the pulley members 3 to 8, inclusive, rearwardly (with respect to Fig. 1). This is desirable because such movement tends to tighten belts 9 and 10 and loosen belts 11 and 12, thereby spreading the members 3 and 5, and 5 and 6. As belts 9 and 10 ride in closer to shaft 3, they of necessity move outward, or forwardly with respect to the shaft. However, by simultaneously shifting the shaft 3 rearwardly, substantial alignment of belts 9 and 10 with the grooves on differential member 13 is maintained, as shown in Fig. 4.

Figure 5:
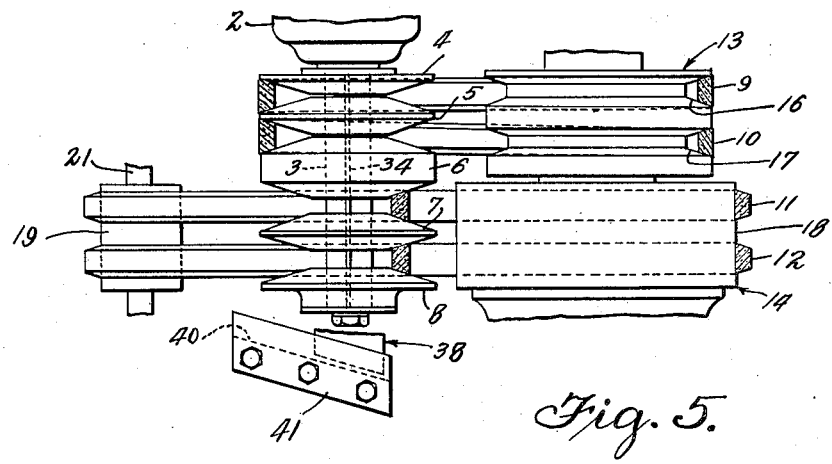
Fig. 5 is a detail plan view showing the pulleys in another position of adjustment.

The other extreme position of adjustment is shown in Fig. 5. Here the shaft 3 has been moved toward the differential unit to increase the diameters of the pulleys defined by members 4, 5 and 6, and forwardly to compensate for the rearward movement of the belts 9 and 10 as they move out toward the rims of the pulley members.

It will be observed that pulley member 6 moves twice as far with respect to member 4 as does member 5. Likewise, belt 10 shifts laterally further than belt 9. It is desirable to mount the motor supporting bar 36 at such an angle as to effect a longitudinal compensating movement of shaft 3 sufficient to over compensate for the lateral shift of belt 9, and under-compensate for belt 10.

Obviously, other numbers of belts may be employed. If only one belt is employed to drive differential member 13, then the angular mounting of the bar 36 may be such as to completely compensate for the lateral displacement of the single belt. If more than two belts are employed to drive differential member 13, then only approximate compensation can be effected for some of the belts since they will all shift by different amounts.

Applications of the invention other than those specifically disclosed will be obvious to those skilled in the art and the invention is therefore to be limited only as set forth in the appended claims.

I claim:

1. In a machine of the type described, a shaft, a flat face pulley positioned opposite said shaft and means for coupling said shaft and pulley for rotation in opposite directions, comprising a V pulley on said shaft having a pair of separable members, one of which is fixed relative to the shaft and the other of which is movable longitudinally on said shaft to vary the effective diameter of the pulley, idler pulley means positioned on the opposite side of said shaft from said flat face pulley, a belt having a V face on one side and a flat face on the other side, said belt being looped over said flat pulley with its flat face in driving relation therewith and looped over said idler pulley means and reverse looped back over the V pulley on said shaft with its V face engaging the latter pulley whereby said V belt engages said flat pulley with a flat face of substantial width and is free to move longitudinally along said flat pulley to at all times maintain itself in alinement with said V pulley.

2. In a machine of the type described, a drive shaft and a pair of coaxial rotary driven members in combination with means for driving said driven members from said drive shaft in opposite directions at inversely variable speeds, said means comprising a pair of V pulleys on said drive shaft coupled thereto for rotation therewith and each pulley comprising a pair of members, one of which is secured to said shaft and the other of which is slidable longitudinally on the shaft, means interconnecting the said other members of the two pulleys, whereby movement of the slidable member of either pulley away from its associated member moves the slidable member of the other pulley toward its associated member, pulleys on said driven members, and means supporting the latter for rotation in fixed position with the pulleys thereon opposite said pulleys on said drive shaft, the pulley on one of said driven members being a V pulley, a V belt looped directly over one of said drive pulleys and the driven V pulley for driving the latter in the same direction as said drive shaft, the pulley on said other driven member being a flat faced pulley, a pair of idler pulleys positioned on the opposite side of said drive shaft from the driven pulleys, a second belt having a V face on one side and a flat face on the other side, said second belt being looped over said flat faced driven pulley with its flat face in driving relation therewith and looped over said idler pulleys with its flat face against the idler pulleys and reverse looped from the idler pulleys back over the other V pulley on said drive shaft, whereby its V face engages the latter pulley, means for shifting said drive shaft obliquely toward and away from said driven members while maintaining said shaft parallel to its previous position, whereby one of said belts is tightened and the other loosened to move the slidable member of one V pulley away from its associated fixed member and thereby move the slidable member of the other V pulley toward its associated fixed member to vary the effective diameters of said drive pulleys in inverse relation and whereby the fixed member of the drive pulley driving said first-mentioned V belt is moved longitudinally a distance equal and opposite to the movement of the cooperating member of that pulley along the shaft to compensate for the movement of the latter and maintain approximate alinement between said first-mentioned V drive pulley and the V driven pulley associated therewith, said second belt being shiftable longitudinally on its associated flat face driven pulley to maintain itself in alinement with the other drive pulley.

HERBERT E. TWOMLEY.